3,436,329
MICROELECTRODE AND METHOD OF MAKING SAME
Alan R. Kahn and Stanford B. Spracklen, Fullerton, Calif., assignors to Beckman Instruments, Inc., a corporation of California
Filed Dec. 11, 1964, Ser. No. 417,628
Int. Cl. C23c 13/02; B01k 3/04
U.S. Cl. 204—195         9 Claims

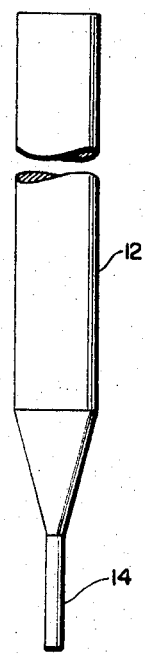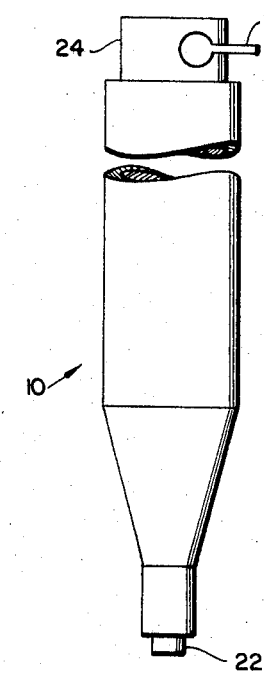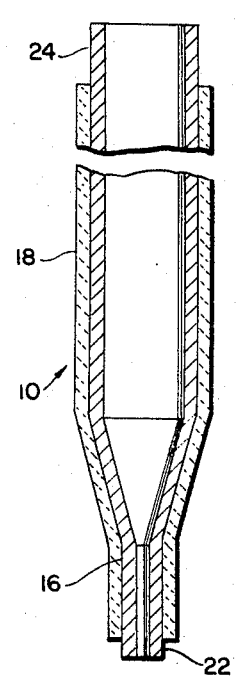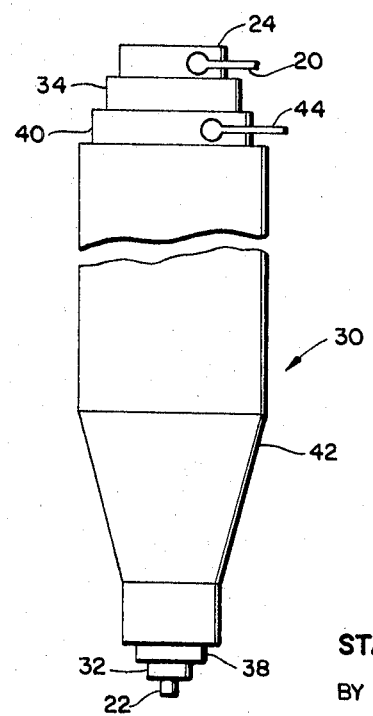

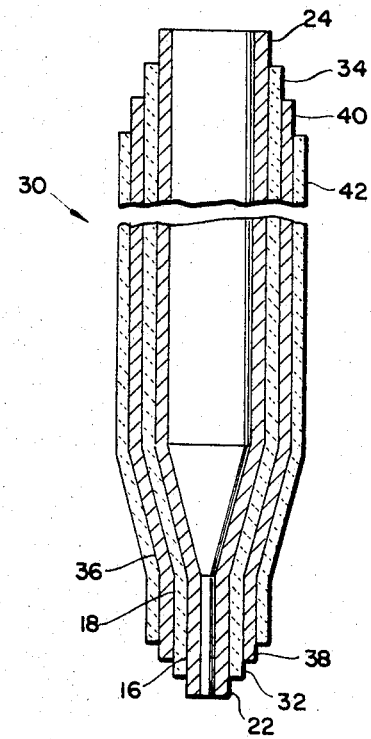
FIG. 5
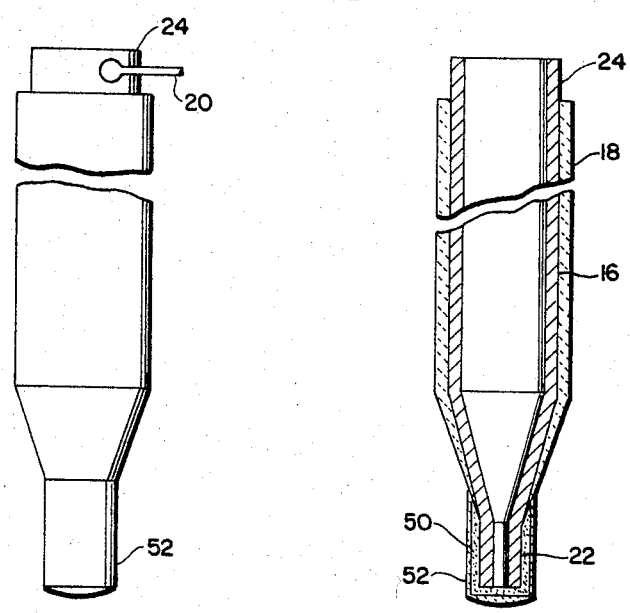
FIG. 6
FIG. 7
INVENTORS
ALAN R. KAHN
STANFORD B. SPRACKLEN
BY *Thomas L. Peterson*
ATTORNEY United States Patent Office 3,436,329
Patented Apr. 1, 1969

ABSTRACT OF THE DISCLOSURE

A microelectrode for making intra-cellular measurements of living plants and animal cells in which a quartz fiber is drawn to a very fine point and then coated with an electrochemically active metal. A coating of a dielectric material is provided over the metal layer except for portions at each end of the quartz fiber, thus exposing a small layer of metal at the fine tip of the fiber which is adapted to contact cells and plant and animal tissues. Additional metal and dielectric coatings may be provided for measuring various chemical parameters.

This invention relates generally to electrodes for making measurements within living plant and animal cells and, more specifically, to microelectrodes for making intra-cellular measurements.

In recent years the necessity has arisen in biological investigations for making intra-cellular measurements of living plants and animal cells. Examples of the types of measurements which are desired to be made are measurements of intra-celluluar potentials and of intra-cellular chemical parameters such as pH, Cl and the partial pressure of oxygen and carbon dioxide. However, no practical means has been developed for making these measurements except for certain microelectrodes for measuring the intra-cellular potentials, which suffer from the defect that they are difficult to make and extremely fragile. One example of a microelectrode for measuring intra-cellular potentials is one comprising a glass pipette constructed by heating a glass tube and drawing a pipette down to a very fine tip, typically one micron or less in diameter. This pipette is then filled with an electrolyte solution in which there is immersed a half cell, the assembly being used as an intracellular electrode. Another type of microelectrode for measuring intra-cellular potentials is made from a thin steel, tungsten or other metallic material by electrolytically etching the tip to a fine point. This type of electrode is coated with a dielectric material which shrinks back slightly from the tip during the drying process leaving a tiny exposed area which can make contact within living cells. These electrodes are very difficult to manufacture, particularly on a mass production basis, and are too fragile to package and ship as is required for commercially practical electrodes. Furthermore, these electrodes are not capable of measuring other intra-cellular parameters than intra-cellular electrical potentials.

It is the principal object of the present invention to provide a practical and rugged microelectrode for making intra-cellular measurements.

Another object of the invention is to provide a microelectrode component which is capable of measuring intracellular potentials in plant and human tissues, and may be modified to measure pH, Cl, the partial pressure of oxygen and $CO_2$, and other chemical parameters.

According to the principal aspect of the invention, a microelectrode component is formed by providing a very thin quartz fiber and drawing it out at one end to a fine point. A layer of an electrochemically active metal is deposited on the thin quartz fiber substrate and a coating of a dielectric material covers the metal layer except for portions at each end of the fiber, thus exposing a small layer of metal at the fine tip of the quartz fiber which is adapted to contact cells in plant and human tissues. The exposed portion of the metal layer at the rear of the quartz fiber is available for connection through a suitable conductor to an external circuit. This microelectrode component is more rugged than the types described above because of the high mechanical strength of the fine quartz fiber in comparison to metal or glass fibers. This basic microelectrode component is capable of measuring intracellular potentials and may be modified by adding additional layers of metal or other materials to render the device capable of measuring other intra-cellular parameters.

Other objects, aspects and advantages will become more apparent from the following description taken in connection with the accompanying drawings wherein:

FIG. 1 is a side view, greatly enlarged, of a quartz fiber which is the substrate for the microelectrode of the invention;

FIG. 2 is a side view, greatly enlarged, of a microelectrode of the invention capable of measuring intracellular potentials;

FIG. 3 is a longitudinal section view through FIG. 2;

FIG. 4 is a side view, greatly enlarged, of a modified microelectrode for measuring certain intra-cellular parameters incorporating the basic microelectrode structure in FIGS. 2 and 3;

FIG. 5 is a longitudinal sectional view through FIG. 4;

FIG. 6 is a side view, greatly enlarged, of a further modification of the microelectrode of the invention incorporating the basic structure shown in FIGS. 2 and 3; and FIG. 7 is a longitudinal section view through FIG. 6 of the drawings.

Referring now to the drawings, wherein like reference characters designate like or corresponding parts throughout the various views, there is shown in FIGS. 1–3 the basic microelectrode component of the present invention. The microelectrode component 10 is formed by first providing a thin quartz fiber 12 which is drawn out to a very fine point 14 as best shown in FIG. 1. The quartz fiber 12 provides the substrate for the microelectrode 10 and is an important part of the invention in that quartz fibers have much greater mechanical strength than do thin wires of metal or drawn down glass tips as have been used in prior microelectrodes. In order to provide a microelectrode for measuring intracellular potentials, a layer of electrochemically active metal 16 is coated over the surface of the fiber 12. The metal layer 16 is coated over the surface of the fiber 12 by vacuum depositing ionized metal, this method being particularly advantageous for use in the present invention inasmuch as this technique permits the formation of an extremely thin film of metal or other materials on a substrate.

After the metal layer 16 is deposited on the quartz substrate 12, as best seen in FIG. 3, a coating or layer 18 is provided on the metal layer 16 of the microelectrode. This coating is of a dielectric material such as silicon dioxide and is deposited on the metal layer 16 by vacuum deposition techniques like that utilized for depositing the metal 16 on the fiber 12. When depositing the coating 18 on the metal layer 16, a tiny portion of the tip of the quartz fiber 12 (for example, 1 micron) and a larger portion of the opposite end of the electrode body (for example, about 1 millimeter) are shielded so that when an ion beam used in vacuum deposition passes over the metal layer 16, only the unshielded portion of the metal layer 16 will be coated with the dielectric substance, thus resulting in an electrode component as shown in FIG. 3. The resulting electrode component, therefore, consists of a quartz fiber 12 coated with a layer of metal 16, which in turn is coated with a dielectric substance which extends over the major portion of the metal layer 16 except for a portion 22 of the metal layer 16 which remains exposed at the thin tip of the quartz fiber 12 and a larger portion 24 of the metal layer 16 at the rear of the electrode component. A wire 20 is attached to the exposed portion 24 of the layer 16 to provide connection to a suitable readout apparatus. Hence, there is provided by the invention a rugged microelectrode component with an attached wire at the rear end which is insulated along its entire length except for the portion 22 which provides the sensitive portion of the microelectrode. The exposed portion of the metal 22 may be about 1 micron in length and the diameter of the tip of the electrode component may be as small as 0.1 micron, thus providing a smaller tip for a microelectrode than has heretofore been obtainable by other devices in the art. A typical length of the electrode component is 5 cm.

The electrode component 10 not only is rugged and thus capable of mass production and shipment, but may be manufactured with reproducible dimensions and electrical source impedance. The electrode component is particularly adaptable for measuring intra-cellular electrical potentials of almost all plant and animal cells and has a wide range of application in measurements of electrically excitable tissues such as muscle, nerve, heart and brain cells.

As seen in FIGS. 4 and 5, the basic electrode component 10 in FIGS. 2 and 3 may be modified to provide a microelectrode for measuring a variety of chemical parameters of cells in plant and human tissues. The microelectrode in FIGS. 4 and 5, generally referred to by numeral 30, differs from that in FIGS. 2 and 3 in that two metal layers are provided separated by a coating of dielectric material with the outer layer of metal being insulated with dielectric material except for portions of the second metal layer at each end thereof, similar to that shown in FIGS. 2 and 3. More specifically, after having provided the quartz fiber 12 with the metal coating 16 and a coating of dielectric material 18, shields (not shown) are moved to cover both the exposed metal portions 22 and 24 and a small portion 32 of the coating 18 adjacent the front end of the electrode component 30 and a portion 34 of the coating adjacent the rear end thereof. Thereafter, an additional layer of metal 36 is a vacuum deposited on the unshielded portion of the layer of dielectric material 18. Thereafter, the shield is further moved to cover a very small end portion 38 of the new metal layer 36 at the forward end of the electrode component and a larger area 40 of the metal layer 36 near the end of the electrode component, with the remaining surfaces 22, 24, 32 and 34 remaining shielded. Then, as a final step, a second layer of dielectric material 42 is a vacuum deposited on the unexposed portion of the metal layer 36 to provide a final insulation along the major portion of the electrode component 30. Hence, there is provided at the forward end of the electrode component 30 two very small exposed portions 22 and 38 of metal for contacting cells of plants or body tissues while at the rear of the electrode component electrical conductors 20 and 44 are connected to the larger exposed portions 24 and 40, respectively, of the metal layers 16 and 36 for connection to an external circuit. Preferably the exposed portions 22, 32 and 38 are about one micron in length while the tip diameter may be about 0.2 to 0.4 micron in diameter.

By applying an appropriate voltage across the conductors 20 and 44 at the rear end of the component 30, a potential difference will appear across the two metal portions 22 and 38 at the tip of the electrode. If the tip is then inserted into the cell of a plant or human tissue, the voltage can be adjusted so that the current flow will indicate the amount of oxygen present at the tip of the electrode. By utilizing general polarographic techniques, the electrode can also be made to measure other ions such as sodium, potassium and chlorine depending upon the voltage applied across the conductors 20 and 44.

The basic electrode component 10 may be further modified in accordance with the present invention for measuring intra-cellular pH by incorporating the principle that a semiconductor material may be used as the electrolyte in a pH-type electrode. To this end, the electrode component 10 shown in FIGS. 2 and 3 is provided with an additional layer 50 of semiconductor material and a coating 52 for the semiconductor 50 of an ionic conductive substance. In order to place the semiconductor layer 50 on the electrode component 10, the major portion of the electrode component is shielded except for the exposed portion 22 of the metal layer 16 and a small portion of the dielectric coating 18 adjacent the exposed metal 22. Consequently, when a semiconductor material is vacuum deposited on the front end of the microelectrode 10, shielded as just described, a layer of semiconductor material 50 is provided over the sides and the front portion of the exposed metal 22 to completely encapsulate the front portion of the metal layer 16. Thereafter, the shield (not shown) is moved rearwardly from the tip of the electrode component so that a slurry of an ionic conductive material, such as a very thin coating of silicon dioxide, may be vacuum deposited over the forward end of the electrode component. Consequently, the finished electrode in FIGS. 6 and 7 will be well insulated except at the rear exposed portion 24 and at its tip which is covered with a thin layer of silicon dioxide which acts in a manner similar to the thin membrane of ion sensitive glass used in conventional pH electrodes. The semiconductor material between the exposed metal surface 22 and the coating 52 replaces the conventional electrolyte found in a glass pH electrode and the metal layer 16 is the electrical contact to the rear end of the microelectrode for connection through the conductor 20 to an external circuit. There is therefore provided a microelectrode for intra-cellular measurements of pH.

In each of the embodiments disclosed, the metal layers may be platinum, silver or other electrochemically active metals which are selected with respect to the electrochemical measurement to be made.

Although several embodiments of the invention have been disclosed herein for purposes of illustration, it will be understood that various changes can be made in the form, details, arrangement and proportion of the various parts in such embodiments without departing from the spirit and scope of the invention as defined by the appended claims.

What is claimed is:

1. In a microelectrode for making intra-cellular measurements, the combination of:
   a thin quartz fiber having one end tapered to a fine tip less than one micron in diameter;
   a layer of metal on said quartz fiber extending from the end of said fine tip to the other end of said fiber; and
   a coating of a dielectric material covering said metal layer except for at least a portion thereof adjacent said end of said fine tip.

2. A microelectrode as set forth in claim 1 wherein said dielectric material is silicon dioxide.

3. In a microelectrode for making intra-cellular measurements, the combination of:
   a thin quartz fiber having one end thereof tapered to a fine tip less than one micron in diameter and having another end;
   a first layer of metal on said quartz fiber extending the entire length of said fiber;
   a first coating of a dielectric material covering said metal layer except for portions thereof adjacent the end of said fine tip and said other end;
   a second layer of metal on said first coating of dielectric material extending the length of said first coating except for portions thereof adjacent to the ends of said first coating of dielectric material; and
   a second layer of a dielectric material covering said second layer of metal except for portions thereof adjacent the ends of said second layer of metal whereby portions of said first and second layers of metal are exposed at each end of said quartz fiber.

4. A microelectrode as set forth in claim 3 wherein the metal of said first and second layers is platinum.

5. In a microlelectrode for making intra-cellular measurements, the combination of:
   a thin quartz fiber having one end thereof tapered to a fine tip and having another end;
   a layer of metal on said quartz fiber extending the entire length of said fiber;
   a first coating of a dielectric material covering said metal layer except for portions thereof adjacent the end of said fine tip and said other end, thereby leaving exposed said layer of metal at each end of said quartz fiber;
   a layer of semiconductor material covering the entire exposed portion of said layer of metal at the fine tip end of said quartz fiber; and
   a coating of ionic conductive material covering the entire surface of said layer of semiconductor material.

6. A microelectrode as set forth in claim 5 wherein said second layer of dielectric material is silicon dioxide.

7. A method of making a microelectrode comprising the steps of:
   drawing out a thin quartz fiber to a fine tip less than one micron in diameter;
   vacuum depositing a layer of metal on said fiber;
   shielding a small portion of the tip and the other end of said fiber; and
   vacuum depositing a layer of dielectric material on the unshielded portion of said fiber thereby providing exposed areas of said metal layer at each end of said fiber.

8. A method of making a microelectrode comprising the steps of:
   drawing out a thin quartz fiber to a fine tip;
   vacuum depositing a layer of metal on said fiber;
   shielding a small portion of the tip and the other end of said fiber;
   vacuum depositing a layer of dielectric material on the unshielded portion of said fiber thereby providing exposed areas of said metal layer at each end of said fiber;
   vacuum depositing semiconductor material over the exposed area of said metal layer at said tip of said fiber; and
   vacuum depositing a layer of ionic conductive material over said semiconductor material.

9. A method of making a microelectrode comprising the steps of:
   drawing out a thin quartz fiber to a fine tip;
   vacuum depositing a layer of metal on said fiber;
   shielding a small portion of the tip and the other end of said fiber;
   vacuum depositing a layer of dielectric material on the unshielded portion of said fiber thereby providing exposed areas of said metal layer at each end of said fiber;
   shielding said exposed areas of said metal layer and a small portion of the ends of said layer of dielectric material;
   vacuum depositing a second layer of metal on the unshielded portion of said layer of dielectric material thereby providing exposed areas of said layer of dielectric material adjacent to each end of said fiber;
   shielding said exposed areas of said layer of dielectric material and of said first mentioned layer of metal and a small portion of the ends of said second layer of metal; and
   vacuum depositing a second layer of dielectric material on the unshielded portion of said second layer of metal.

References Cited

UNITED STATES PATENTS

| | | | |
|---|---|---|---|
| 2,316,292 | 4/1943 | Schonfeld | 117—229 |
| 3,205,413 | 9/1965 | Anderson | 117—107.1 |
| 3,013,176 | 12/1961 | Field. | |
| 3,313,293 | 4/1967 | Chesebrough et al. | 128—2.1 |

OTHER REFERENCES

Taylor: "Proc. of the Soc. for Experimental Biology and Medicine," vol. 23 (1925–6), pp. 147 and 158.

HOWARD S. WILLIAMS, *Primary Examiner.*

T. TUNG, *Assistant Examiner.*

U.S. Cl. X.R.

117—106, 107, 123, 126, 217, 229; 128—2.1